United States Patent [19]

Isogai et al.

[11] Patent Number: 4,639,787
[45] Date of Patent: Jan. 27, 1987

[54] IMAGE-SCANNING APPARATUS

[75] Inventors: Masaki Isogai, Tokyo; Atsushi Kawahara, Kawasaki, both of Japan

[73] Assignees: Kyodo News Service; Nippon Kogaku K. K., both of Tokyo, Japan

[21] Appl. No.: 647,422

[22] Filed: Sep. 5, 1984

[30] Foreign Application Priority Data

Sep. 16, 1983 [JP] Japan .................. 58-170809

[51] Int. Cl.⁴ ............... H04N 5/253; H04N 5/238
[52] U.S. Cl. ............................. 358/214; 358/228
[58] Field of Search ............ 358/228, 225, 214, 216, 358/54; 250/578, 201

[56] References Cited

U.S. PATENT DOCUMENTS

| | | | |
|---|---|---|---|
| 3,624,291 | 11/1971 | Miyata | 358/214 |
| 3,804,976 | 4/1974 | Gard | 358/225 |
| 3,931,464 | 1/1976 | Murase . | |
| 4,158,859 | 6/1979 | Kerbel | 358/228 |
| 4,255,764 | 3/1981 | Howe | 358/214 |

Primary Examiner—Gene Z. Rubinson
Assistant Examiner—Stephen Brinich
Attorney, Agent, or Firm—Shapiro and Shapiro

[57] ABSTRACT

An image scanning apparatus for making picture signals has an optical system for forming an image of an object on a predetermined plane and means for scanning the object image by a light-receiving surface disposed on the predetermined plane and generating an output indicative of the light intensity distribution of the object image on the plane. The apparatus comprising first driving means for moving the scanning means relative to the object image, second driving means for moving the scanning means relative to the object image in response to the completion of movement of the scanning means by the first driving means, means for controlling the exposure of the light-receiving surface of the scanning means during the movement of the scanning means by the second driving means in accordance with the output of the scanning means generated during the movement thereof by the first driving means; and means for processing the output of the scanning means generated during the movement thereof by the second driving means into a picture signal corresponding to the object image in accordance with the output of the scanning means generated during the movement thereof by the first driving means.

9 Claims, 14 Drawing Figures

IMAGE-SCANNING APPARATUS

BACKGROUND OF THE INVENTION

1. Field of the Invention

The present invention relates to an image-scanning apparatus of the plane scanning type in which a linear image sensor is mechanically scanned in the longitudinal direction of the sensor and in the direction perpendicular to the length of the sensor. The scanner according to the invention is suitable especially for the formation of picture signals for phototelegraphic transmitter.

2. Description of the Prior Art

In a conventional phototelegraphic transmitter a rotary drum is used to produce picture signals by scanning of photoelectric sensor element. Typically a photographic printing paper is placed round the rotary drum and the drum is rotated while moving the photo-electric sensor element linearly in the direction of rotation axis of the drum. Picture signals are produced by scanning of the sensor element by the drum rotation (which will hereinafter be referred to as the primary scanning) and also by scanning of the sensor element by its own movement in the direction of rotation axis of the drum (which will hereinafter be referred to as the secondary scanning).

The above-mentioned type of prior art scanning system has some drawbacks. First of all the primary scanning must be carried out by the rotation of a drum the rotational speed of which is mechanically limited as a matter of course. As the rotational speed of the drum is limited, it is difficult to precisely extract the density information of the object, namely the photographic paper on the drum, in a short time by a high-speed pre-scanning on the whole object.

Another drawback of the prior art system is found when the object on the rotary drum is a photographic film or the like for which transmission illumination is needed. In this case, the drum is required to be transparent. Of the illumination optical system and the optical detection element, one is disposed within the transparent rotary drum and the other is outside of the drum. In addition, it is necessary to linearly move them together as a pair in the direction of rotation axis of the drum for the secondary scanning. This may be attained only by a very complicate structure. Furthermore, in the case of film of small size such as 35 mm photographic film, there are required not only a very high precision of film feeding in the secondary scanning direction but also a very high resolution in the primary scanning direction at the same time.

A further drawback of the image-scanning apparatus for a telephotographic transmitter of the type in which a photographic printing paper is wound round a rotary drum is that it needs a long preparatory work for transmission. The photographic printing paper must be prepared from a film through many steps of processing such as enlargement, trimming, printing and development. These works are time-consuming and must be done in a dark room. Because of it the location for transmission is naturally limited. During the process of printing images on a photographic paper from a photographic film some of image information which the original film possesses may be missed, the resolution of image may be degraded and further the delicate gradation of the original images may be lost. These problems are inevitable in the prior art apparatus.

SUMMARY OF THE INVENTION

Accordingly it is an object of the invention to provide an image-scanning apparatus which is able to form good and proper picture signals for telephotography irrespective of the kind of object. If the object is a photographic medium, it may be a photographic film or printing paper, and also the object may be positive image or negative image. Irrespective of the kind of the object, the pre-scanning of image can be carried out in a short time to correctly extract the density information of the object.

It is another object of the invention to provide an image-scanning apparatus which enables to grade up the image quality to a level above a predetermined value even if the object is a negative film exposed improperly.

It is a further object of the invention to provide an image-scanning apparatus which is simple in construction and able to provide information of printing plate necessary for printing in a simple form.

Other and further objects, features and advantages of the invention will appear more fully from the following description taken in connection with the accompanying drawings.

BRIEF DESCRIPTION OF THE DRAWINGS

FIGS. 3B-1 and 3B-2 are in combination a flow chart showing the manner of operation of the part shown in FIG. 3A;

DESCRIPTION OF PREFERRED EMBODIMENTS

Figures 1, 2:
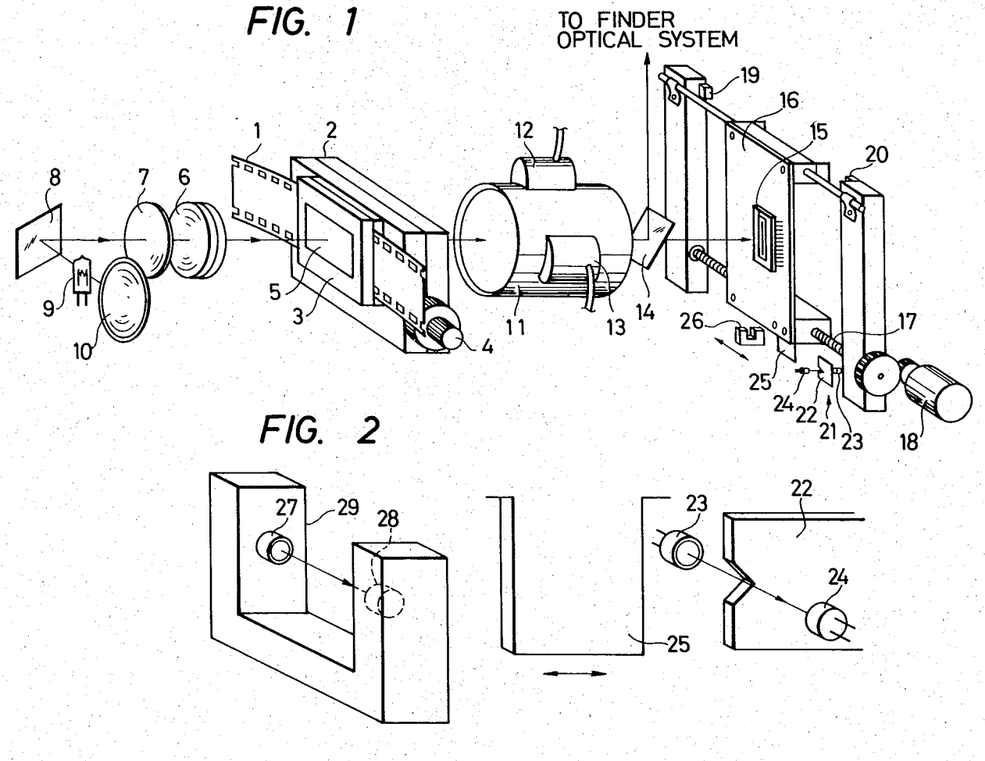
FIG. 1 schematically shows the arrangement of the essential parts of the optical system and mechanical system of an embodiment of the present invention.
FIG. 2 is a schematic view showing a photo interrupter.

Referring first to FIG. 1 showing an embodiment of the invention, a 35 mm film as an example of object is designated by 1. The film 1 is held by a film holder 3 rotatably mounted on an X-Y stage 2. The stage 2 is movable in both of the vertical direction and the horizontal direction. 4 is a dial for moving the stage 2 in the directions.

The film holder has a window 5 the size of which corresponds to one picture frame in the film 1. The film holder is composed of two plane plates of glass each having the window 5. The film 1 is held sandwiched in between the two glass plates.

To illuminate the film 1 in the fashion of transmission-illumination, an illumination optical system is provided which comprises an illumination lens 6, filter 7, thermal ray-transmitting dichroic mirror 8, lamp 9 and reflecting mirror 10.

Designated by 11 is a zoom lens which includes a magnification variable lens to be moved frontward and rearwards along the optical axis by a zooming motor 10 with potentiometer 12 to obtain an optimum magnification. In the zoom lens 11 there is provided a diaphragm which can be closed and opened by a diaphragm motor with potentiometer 13. Behind the zoom lens there is a turn-up mirror 14 which is used to display the optical image in a finder for trimming. During the image scanning, the mirror is held in the position turned up.

The primary scanning on the focusing plane is carried out by a linear image sensor 15 itself. The image sensor 15 is mounted on a base plate 16 which can be moved by a feed screw 17 in the direction perpendicular to the longitudinal direction of the image sensor. The direction in which the base plate with the image sensor is moved by the feed screw is the secondary scanning direction. The feed screw 17 is driven by a motor 18 through gears.

At both stroke ends in the secondary scanning direction there are provided limit switches 19 and 20 to generate a stop signal. 21 is a photo interrupter for precisely detecting the start position of image input scanning. This start position-detecting photo interrupter is used for precise positioning of images, for example, when a color picture image is color-separated using three or four filters 7 and the color-separated images are sequentially scanned one by one for the input of the color picture image.

An example of the start position-detecting photo interrupter is shown in FIG. 2. The photo interrupter is constituted of a pair of light-emitting element 23 and light-receiving element 24 and two separate thin plates 22 and 25. The thin plate 22 is fixed to the main apparatus and has a wedge-like cutout. The innermost edge of the cutout is aligned with the centers of the elements 23 and 24 as seen in FIG. 2. The other thin plate 25 is fixed to the movable base plate 16. As the base plate 16 is moved in the secondary scanning direction, the path of light running from the light-emitting element 23 to the light-receiving element 24 is closed or opened at a certain time point which is detected as a signal of the start position.

Designated by 26 is a photo interrupter for detecting the end position of the secondary scanning. For the detection of this end position so high precision as that of the start position is not required. An example of the end position-detecting photo interrupter is also shown in FIG. 2. The photo interrupter includes a fixed member 29 on which a light-emitting member 27 and a light-receiving member 28 are mounted opposed to each other. The thin plate 25 can move between the elements 27 and 28 so as to interrupt the light toward the light-receiving element 28 from the light-emitting element 27. The photo interrupter 26 can be manually set to any selected position in the secondary scanning direction to accommodate itself to any size in the direction of the object to be scanned.

Figure 3A:
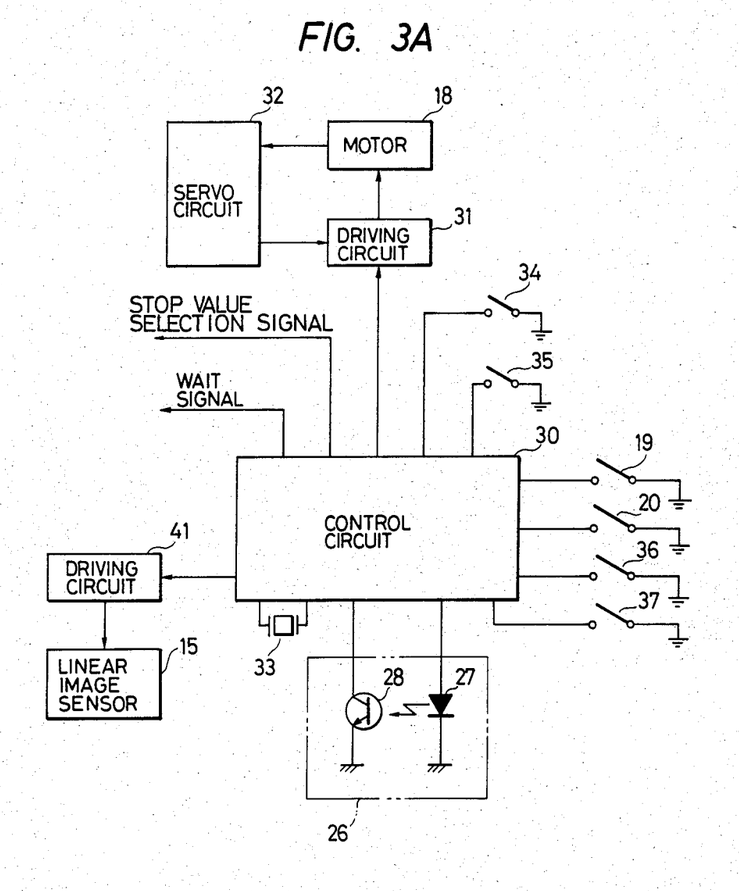
FIG. 3A is a block diagram showing the control part for pre-scanning and regular scanning according to the invention.
Figure 3B:
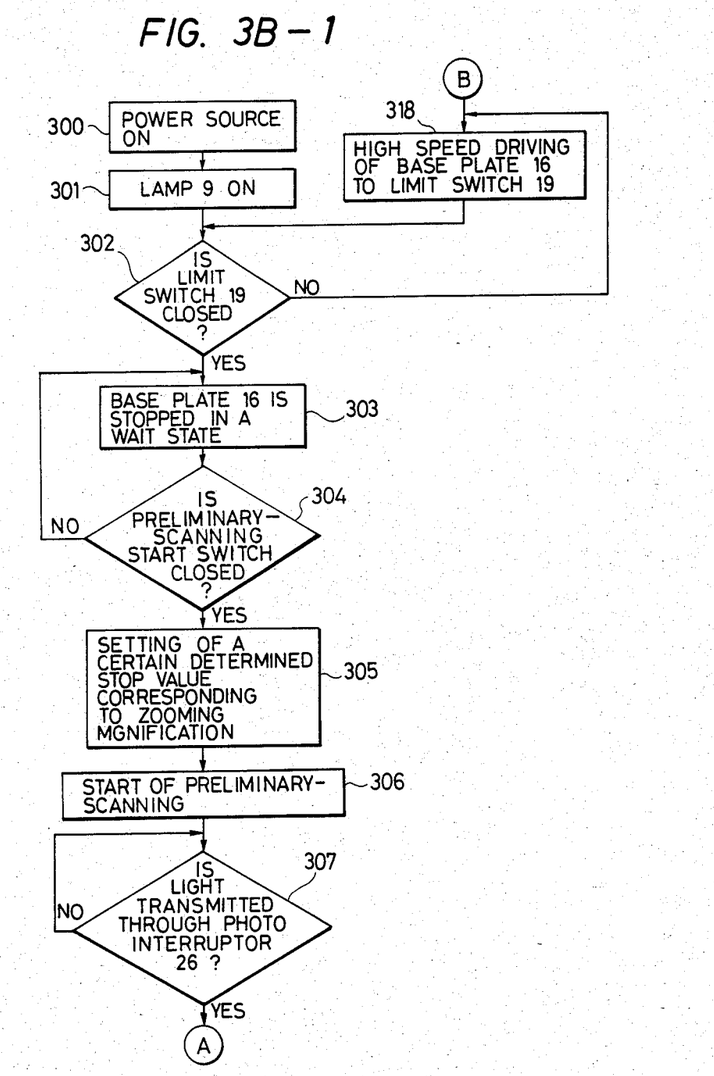
Figure 3B:
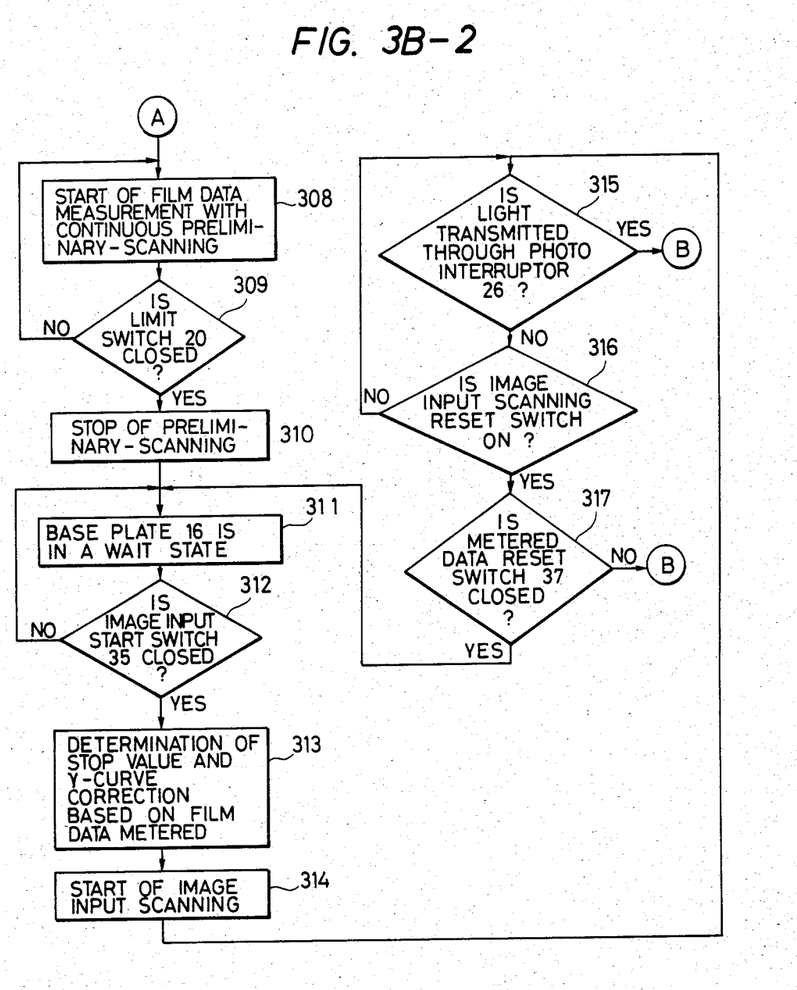

FIG. 3A is a block diagram showing the control part for controlling the drivings of pre-scanning and regular scanning of the apparatus according to the invention, and FIG. 3B is a flow chart showing the operation of the control part.

Referring to FIG. 3A a quarts oscillator 33 is connected to a control circuit 30. In accordance with a reference pulse from the oscillator 33, the control circuit 30 generates a driving pulse to a driving circuit 41 for driving the linear image sensor 15 and also to a driving circuit 31 for driving the motor 18. Further connected to the control circuit 30 are a start switch 34 for pre-scanning, a start switch 35 for regular scanning, limit switches 19, 20, resetting switches 36, 37 and light-emitting diode 27 and photo transistor 28 of the above-mentioned photo interrupter 26. 32 is a servo circuit connected with the motor 18 and the driving circuit 31 to control the phase of period of rotation of the motor 18. Wait signal and selection signal shown in FIG. 3A will be described later with reference to FIG. 4.

An example of the sequence of operations of the above control part will hereinunder be described with reference to the flow chart of FIG. 3B.

At step 300, a power source is connected in the apparatus. Thereby the lamp 9 puts on at step 301. In this state, if the sensor base plate 16 is not in the position at the stroke end on the side of the limit switch 19, then the operation is advanced to step 318 from step 302 to directly drive the base plate 16 at a high speed by the motor 18. The base plate is stopped when the limit switch 19 is closed. The operation is advanced to step 303. In this state, the lens aperture is at the maximum. The operator carries out trimming while viewing the image through the finder (not shown). Trimming is carried out by zooming, X-Y displacement and, if necessary, rotating the film holder 90° relative to the optical axis. After completing the trimming, step is advanced to 304. By closing the pre-scanning start switch at this step, the aperture is stopped down to a certain determined aperture value at step 305. The aperture value determined at the step 305 corresponds to the set value of the zooming magnification. More specifically, the aperture value is such a predetermined value at which the linear image sensor 15 can not be saturated even with the maximum quantity of light transmitted through the film.

After the aperture being stopped down to the above value, the pre-scanning is started at step 306. The pre-scanning is started toward the limit switch 20 from the side of the limit switch 19 of the secondary scanning direction.

The purpose for which the pre-scanning is carried out is to preliminarily extract information about density from the film containing the object for which the image input is to be done. Based on the information obtained from it the optimum illumination on the image plane is selected and a gamma (γ) correction curve is automatically selected to obtain good picture signals. The measurement of the film density data at step 308 is started when the change from light-blocking to light transmission by the stop position-detecting photo interrupter 26 for image input scanning is detected at step 307. And the measurement is ended when the limit switch 20 is closed or the light of the start position-detecting photo interrupter 21 is blocked out. With the closing of the limit switch 20, the step of operation is advanced from 309 to 310 and the pre-scanning itself is also finished. Now the base plate 16 stops at the stroke end on the side of limit switch 20. As step 311, the base plate comes in a wait state for image input scanning.

Thereafter, man closes the start switch for image input scanning (step 312). The base plate 16 is driven to move at a constant speed in the direction opposite to the direction for the above pre-scanning and a picture signal is generated from the image sensor 15 at every constant pitch (step 314).

However, immediately before the start of the image input scanning, the opening of aperture is adjusted to a value by a circuit later shown in FIG. 4 and the aperture is fixed at the value (step 313). The aperture value set at the step 313 is such a value at which the image sensor can not be saturated but the possible highest intensity of illumination can be obtained on the image plane.

The image input scanning is completed, as shown by step 315, when the change from light transmission to light-blocking of the interrupter 26 is detected. Thereafter, the sensor base plate 16 is moved at high speed until the limit switch 19 is closed (step 318, step 302). Then, it returns back to the same wait state as that immediately after the turn-on of the power source (step 303).

It is not always necessary to use the image input scanning start switch for the above sequence of from pre-scanning to image input scanning. It is possible to automatically start the image input scanning continuously from the pre-scanning without using the start switch.

The above-shown apparatus according to the invention is provided with two resetting switches 36 and 37 to stop the image input scanning in the middle of scanning. The two resetting switches have different functions. The switch 36 is a resetting switch for storing the measured data corresponding to step 316. By this resetting switch the base plate 16 is returned to the start position for image input scanning and to step 315. The other one 37 is a resetting switch for clearing the measured data corresponding to step 317. By this resetting switch the base plate 16 is moved at high speed toward the start position for prescanning, that is, the stroke end on the side of limit switch 20 and gets in the wait state corresponding to step 311. The former is useful for the case where scanning is carried out again without changing the trimming conditions once set. The latter is useful for change of trimming condition or film exchange.

Figures 4, 4A:
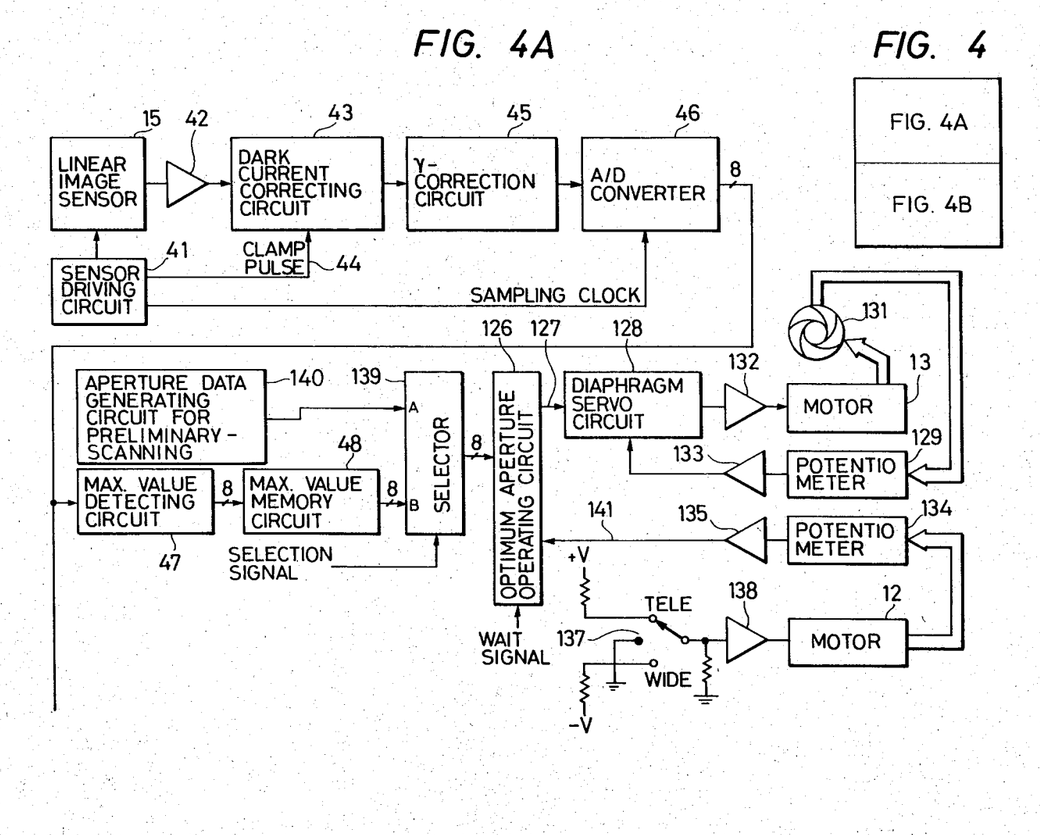
FIG. 4 composed of FIGS. 4A and 4B, is a block diagram showing the signal system in an embodiment of the invention.
Figure 4B:
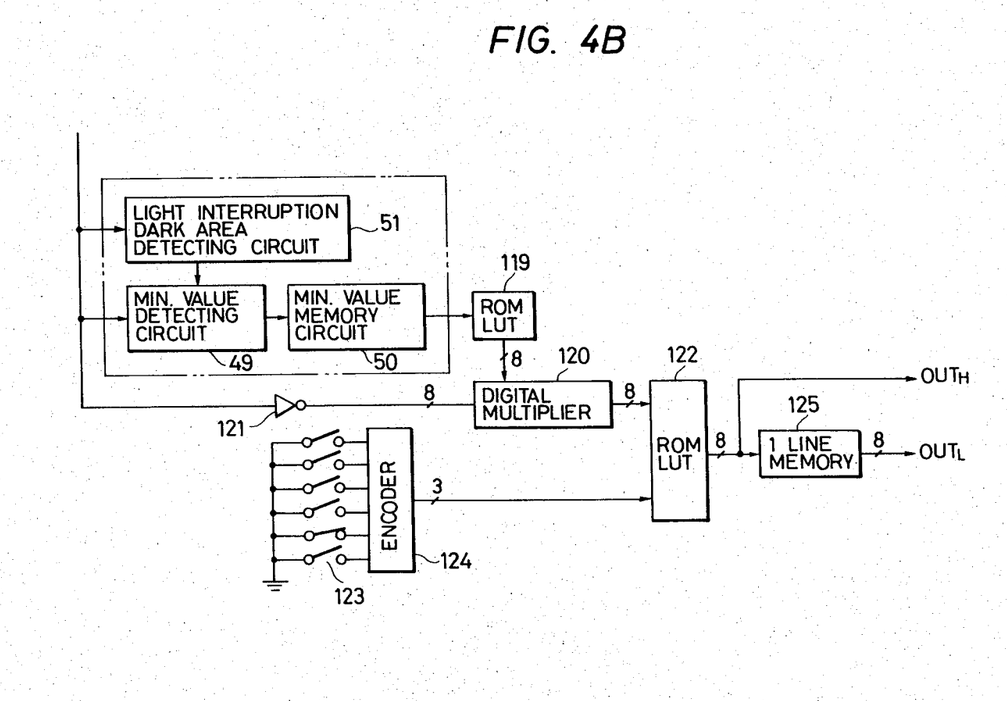

FIG. 4 is a block diagram showing the part for making picture signals in the image-scanning apparatus according to the invention, in particular, showing the part related to the signal processing system. The part from linear image sensor 15 to A/D converter is shown in the upper portion of the drawing of FIG. 4, a control circuit for controlling the aperture of the zoom lens in the middle of the drawing and a gamma-correcting circuit is in the lower portion of the drawing.

The image sensor 15 is driven by a sensor driving circuit 41. The sensor is operated with a storage time predetermined taking into consideration the temperature range of the atmosphere under which the apparatus is used, the light quantity of the light source then used etc., and it generates an output corresponding the distribution of light intensity of the object image. The output of the sensor 15 is amplified by a pre-amplifier 42. The amplified output is clamped by a dark current correcting circuit 43 using a clamp pulse 44 so as to adjust the optical black portion of the sensor to a reference level and thereby the rise caused by the dark current is corrected. Then, gamma correction is carried out by a first γ-correcting circuit 45. The first γ-correcting circuit is an analogue γ-correcting circuit This γ-correcting circuit is provided to keep the number of bits of A/D converter within an acceptable range, for example, less than 8 bits, and also to prevent the generation of quantizing noise and false outline part by the subsequent digital processing.

For better understanding of the invention, the purpose of γ-correction in the present invention will be described in detail.

Considering the case where the object is a negative film as an example, the gamma value of it is generally in the order of 0.6 to 0.7 although the value is variable depending on the conditions of development, the kind of film used etc. To produce positive picture signals from the negative film a similar gamma correction to that for photographic printing paper must be carried out. For photographic printing paper it is possible to select the gamma value among several different values ranging from soft tone to hard tone. In practice, however, the value usually used is in the range of from 1.5 to 3.5 in bar gamma value. Therefore, for the gamma correction in the apparatus according to the invention, it is also necessary to provide values corresponding to those gamma values.

However, if man tries to carry out the gamma correction digitally for all of those values, there will be produced a difficult problem. For example, quantization becomes relatively rough at the portion of high density in the negative film, that is, at the portion in which the output level of the image sensor is low. Because of the rough quantization, a problem of image degradation such as false outline part brings about. In order to solve the problem, according to the invention, a gamma correction circuit which carries out gamma correction analogously is provided before A/D converter 46. The gamma correction circuit corrects the gamma value of the negative film to a smaller value, for example, to 0.4. By this correction the low level output is expanded so that fine quantization at the white part of positive image can be attained. In this connection, it is to be understood that larger gamma value of photographic printing paper dealing with positive image corresponds to smaller gamma value of analog gamma correction circuit 45 dealing with negative image.

In the embodiment shown above, there has been used an A/D converter 46 having a linear characteristic by which an input analog signal is equally level-divided. However, the first γ-correcting circuit 45 and the A/D converter 46 may be replaced by a nonlinear A/D converter which has also the characteristic of the first γ-correcting circuit 45 and more finely divided quantization levels for the low level side.

The digital signal obtained as the output from the A/D converter 46 in the shown embodiment is processed in two ways during the pre-scanning in order to detect the maximum value and the minimum value in output level of the sensor 15 within the effective scanning range (area scanned between photointerrupter 26 and limit switch 20 in FIG. 1).

The maximum value detected by a maximum value-detecting circuit 47 is stored in a memory circuit 48. In the shown embodiment the maximum value is detected digitally. But, as a modification, the maximum value may be detected also by the peak-hold of the analog signal before the A/D converter 46. The minimum value is detected by a minimum value-detecting circuit 49 and then stored in a memory circuit 50. For a particular purpose a light interruption dark area detecting circuit 51 is connected to the minimum value-detecting circuit 49. The function of this dark area detecting circuit 51 is to discriminate between film 1 and film holder 3 when the latter accidentally comes into the scanning area and to prevent the minimum value from being effected by it. Concretely, the discrimination is made using the difference in sensor output between the maximum density portion of film and the light-interrupting portion. For this reason the fog on the sensor surface by any stray light of the optical system should be minimized.

Figure 5:
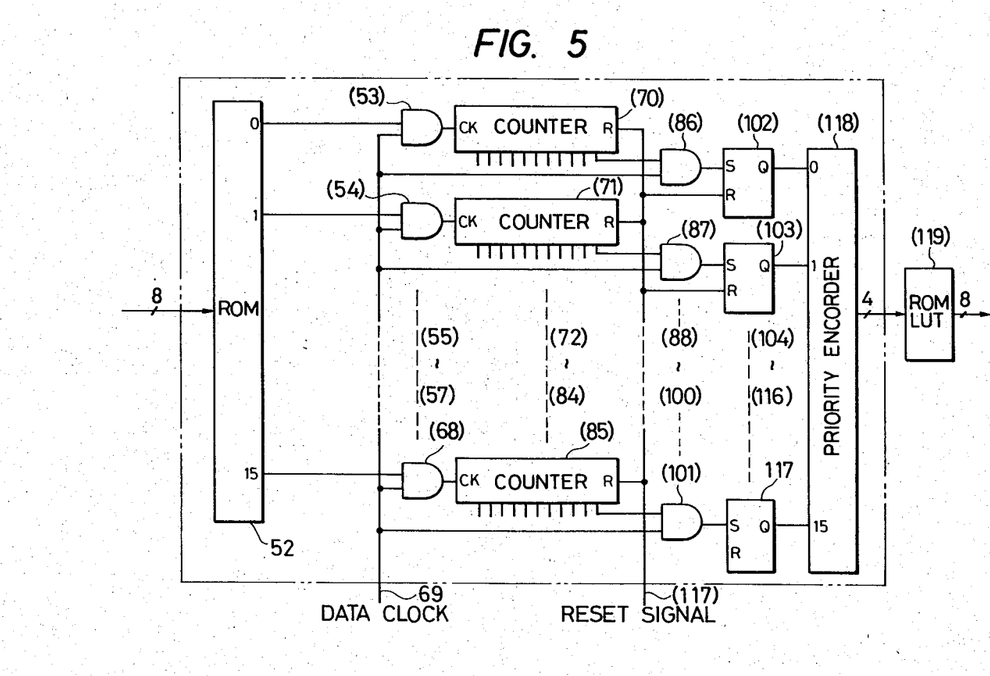
FIG. 5 is a block diagram showing an embodiment of the circuit for detecting the minimum sensor output level.

FIG. 5 is a block diagram showing an example of the circuit for detecting the minimum sensor output level, which comprises the minimum value detector 49, memory 50 and light-blocked dark area detector 51.

In FIG. 5 the read-only memory (ROM) 52 is of 8 bit address and 16 bit output. 8-bit input code of the ROM 52 can represent two-hundred fifty-six (256) different values. Sixteen outputs of the ROM 52 are always logic 0 for input values of 0 (00000000) to 7(00000111) representing the black level side and all values more than 72 (01001000) among the above 256 values. Inputs from level 8 to 71 are divided into sixteen groups stepwisely with four levels per group. Sixteen output terminals 0 to 15 are allotted for these sixteen groups of input level. For example, the output terminal 0 of the ROM 52 has logic 1 for the input level from 8 to 11, the output terminal 1 has logic 1 for the input level from 12 to 15, the output terminal 2 has logic 1 for the input level from 16 to 19 and so on. So, the last output terminal 15 of the ROM 52 becomes logic 1 for the input level from 68 to 71.

Light-blocking portion such as film holder has a value smaller than 7 and therefore it is not detected by the detection circuit. Also, those light portions of a film having values larger than 72 are not detected by the detection circuit for the same reason.

As shown in FIG. 5, every output line of ROM 52 has a two-input AND gate (53-68) connected thereto. Applied to one input of the AND gate is a data clock 69. Consequently, when one of the outputs 0 to 15 is rendered logic 1 by an input level, one of AND gates 53 to 68 generates a pulse. To count these pulses counters 70 to 85 are connected to the output terminals of AND gates 53 to 68 respectively. Further, as shown in FIG. 5, the outputs of the counters 86 to 85 are connected to SR flip-flops 102 to 117 through AND gates 86 to 101 respectively. When the counter has counted pulses more than a predetermined number, the corresponding SR flip-flop generates an output of logic 1. With the above construction, the circuit shown in FIG. 5 divides picture elements having the same output level into sixteen groups and detects the level of such a picture group as the minimum value which occupies a percentage larger than a determined value relative to the sum of picture elements on the picture area pre-scanned. Thus, when a flip-flop has an output of logic 1, it means that the film density of the corresponding level range exists over a larger area than the pre-determined percentage of the picture. The correspondency of the predetermined number of pulse to the area percentage can be obtained in a simple manner by using a presettable counter as the counter for counting pulses and changing its preset value in accordance with the scanned area, that is, the position of the stop position-detecting photo interrupter 26.

The minimum value detector in the above embodiment may be modified in such manner that the analog value can be processed before A/D converter 46.

Immediately after the start of pre-scanning, counters and SR flip-flops are reset by means of reset signal 117 from the control circuit 30. The control circuit 30 generates the clock 69 during the pre-scanning time only. Connected to the outputs of SR flip-flops is a priority encoder 118 which gives the order of priority to sixteen SR flip-flops 102 to 117 in such manner that the flip-flop of the smallest number has the highest priority. When two or more SR flip-flops generate outputs of logic 1 at the same time, the priority encoder encodes only the level corresponding to the smallest number flip-flop of them, and it generates an encoded output. The output of the priority encoder 118 is connected to a ROM 119 in which a normalization factor has previously been written. The normalization factor is used to normalize the range of input data and limit data within a certain range (in this embodiment the range is from 0 to 192).

Referring again to FIG. 4 the operation of the periphery of ROM 119 will hereinafter be described in connection with image input scanning.

During image input scanning, 8-bit normalization factor is applied to a digital multiplier 120 from the look-up table (hereinafter referred to as LUT in brief) of the ROM 119. The multiplier 120 multiplies the normalization factor by the output applied thereto from A/D converter 46 through an inverter.

As will be shown in FIG. 6 later, the normalization should not be carried out in the same manner for all of detected minimum values. So long as the detected minimum values is small, the same data range, for example, ranging from 0 to 192 may be used. But, when the detected minimum value is larger, the range should be changed gradually with increasing of the minimum value in such manner that the side of 192 is gradually reduced. Herein, the term "side of 192" is used regarding the result of inversion of the output of A/D converter by the inverter 121 which gives a one's complement. Therefore, the side of 192 means the side on which the density of film is high.

When the minimum value is not detected by the minimum value detector within the determined level range (which is, in the present embodiment, from 8 to 71, the correction factor is no longer changed but remains constant. The output of the digital multiplier 120 varies depending on the level range of the input data. In this manner any excessive correction can be avoided for a film in which the distribution of density is only within a limited range.

The output of the multiplier 120 containing information of level confined in a certain range is then added to LUT of ROM 122 as a part of address. The remaining 3 bits of the address of the ROM 122 are connected to an encoder 124. The encoder is the output encoder of a set of reference gamma selection switches for selecting any desired one of five different reference gamma curves. The outputting of image signal from the ROM 122 can be done through high speed digital output line OUTH or through low speed digital output line OUTL alternatively in accordance with necessity. When the high speed output line OUTH is selected, the image signal, namely the output of ROM 122 is sent out directly. On the contrary, when the low speed output line OUTL is selected, the image signal is sent out through a one line memory 125 which changes the output speed to a low speed. The latter is advantageously used for phototelegraphic transmission through telephone line. The one line memory 125 may be connected before or after the inverter 121 if it is desirable.

In the present embodiment, as previously described, the input data are normalized and confined in a determined range by multiplication by a determined normalization factor in accordance with the minimum value then detected. Therefore, the gamma value is variable depending on the level. However, this embodiment may be modified by substituting one and single ROM for the combination of ROM 119 and multiplier 120 and using the single ROM as LUT. In such a modification it is possible to carry out the normalization while keeping the gamma value stored in the memory.

The manner of control of a diaphragm 131 is as follows:

In order to control the diaphragm 131 (FIG. 4) the control circuit 30 (FIG. 3A) transmits two control signal to the diaphragm control part. One of the two control signals is a wait signal informing of the state of apparatus as to whether the apparatus is now waiting or going on scanning. The other control signal is a selection signal informing of whether the scanning now going on is pre-scanning or regular scanning (image input scanning).

When the apparatus is in the state of wait, an optimum aperture operating circuit 126 generates a maximum aperture voltage as the output signal 127 in FIG. 4. The output signal 127 is applied to a diaphragm servo circuit 128 which drives the motor 13 up to the position in which the output voltage of a potentiometer 129 directly connected with the motor becomes equal to the maximum aperture voltage of the applied signal 127. Of course, the motor is interlocked with the diaphragm. Therefore, the diaphragm is opened fully to brighten the finder view field.

132 is a motor-driving amplifier and 133 is a buffer amplifier of potentio voltage.

From a potentiometer 134 a voltage is being applied to the optimum aperture operating circuit 126 through a buffer amplifier 135. The potentiometer 134 detects the position of the zoom lens. The applied voltage to the circuit 126 from the potentiometer is used to detect the change of brightness on the image plane caused by zooming magnification.

A motor 12 drives the magnification variable lens contained in the zoom lens 11. By applying a positive or negative voltage manually to it, the position of the lens can be changed from telephoto side to wide side. 137 is a switch momentarily closed to TELE or WIDE. 138 is a motor-driving amplifier.

Designated by 139 is a selector whose output is connected to the operating circuit 126. For the execution of pre-scanning, the selector 139 selects A input, namely, data from an aperture data generating circuit for pre-scanning 140. From the data and the zooming magnification detection signal 141 the optimum aperture operating circuit 126 determines an aperture value at which the sensor 15 can never be saturated. The operating circuit 126 then generates an output 127 indicative of the determined aperture value to the servo circuit 128.

For the execution of image input scanning, the selector 139 selects B input, namely, the output from the maximum value memory 48 corresponding to the highest level value obtained by pre-scanning. From the maximum level value and the zooming magnification detection signal 141 the optimum aperture operating circuit 126 operates an aperture value satisfying the conditions that it never saturates the sensor 15 and that the aperture is to be opened as widely as possible. The determined aperture value is also applied to the diaphragm servo circuit 128.

Figure 6:
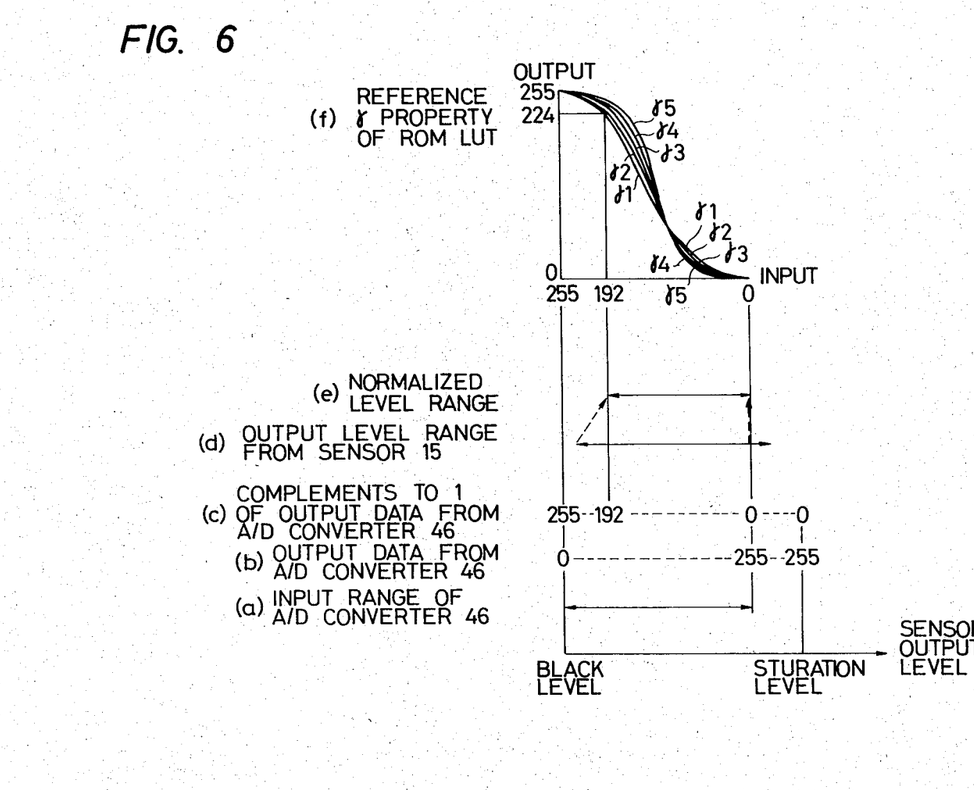
FIG. 6 illustrates the signal processings for negative film.

FIG. 6 illustrates the signal processings for a negative film in the image-scanning apparatus according to the invention.

In the drawing of FIG. 6, the lower abscissa indicates the output level of sensor 15. Shown at (a) above the abscissa is the input range of A/D converter 46. As seen from it, the input range is not always needed to completely correspond to the range of from black level to saturation level of the sensor output. Shown at (b) is the output of A/D converter 46 after the conversion of binary code into decimal. For all of input voltages beyond the input range of A/D converter there is generated the same output of 255. Shown at (c) are complements to 1 of the output binary code of A/D converter. Shown at (d) is an example of the output level range of the sensor 15 for an object film. As previously described, in an image input scanning, the aperture value is set to a value at which the sensor 15 can never be saturated, and the set aperture value corresponds to the maximum input level of A/D converter 46. However, in practice, the control on diaphragm involves some error. Therefore, as shown in (d), there is the possibility that the input level of A/D converter 46 may exceed the maximum input level encodable to ROM 122. This does not mean any significant disadvantage. The portion over the maximum input level is the portion on the transmission side of negative image. In positive image, the portion corresponds to black which may be lost to some extent without disadvantage.

The level range normalized within the range of 0 to 192 is shown at (e).

Shown at (f) of FIG. 6 drawing is a graph with the input of ROM 122 on the abscissa and the output on the ordinate.

Curves $\gamma_1$ to $\gamma_5$ are gamma curves for selection. Like the number of photographic printing paper, the gamma curves are numbered in the order of tone, No. 1 being on soft tone side and No. 5 on hard tone side. In operating the apparatus of the invention, therefore, the operator can select one of the gamma curves at his will as if he would select the number of photographic printing paper.

Figure 7:
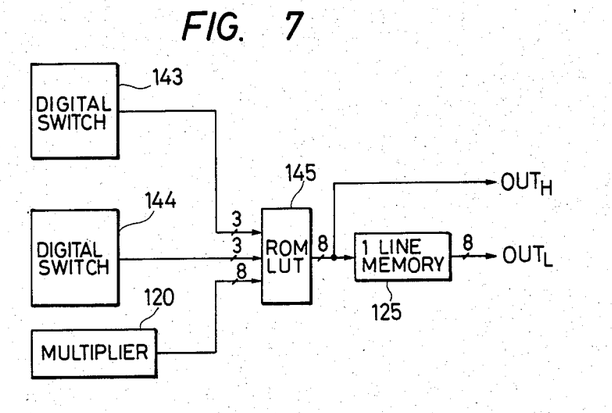
FIG. 7 is a block diagram showing an embodiment of the γ-correcting circuit.
Figure 8:
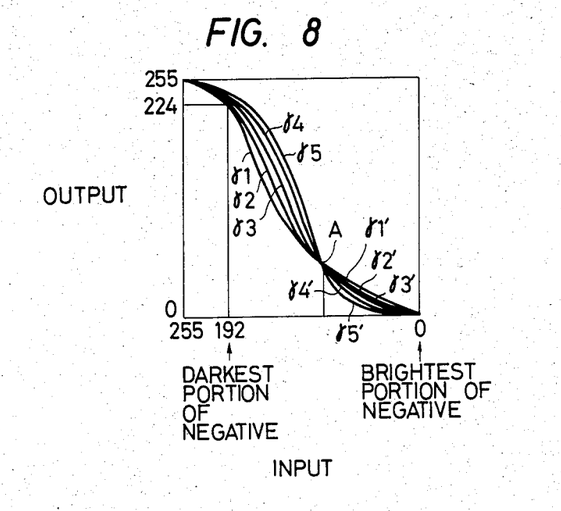
FIG. 8 is a characteristic curve showing the output of the γ-correcting circuit shown in FIG. 7.

FIG. 7 shows another embodiment of gamma correction according to the invention. FIG. 8 shows the characteristic curves thereof. As seen from FIG. 8, the gamma correction according to this embodiment can be made using ten different gamma curves of which five curves $\gamma_1$ to $\gamma_5$ are on bright side and the remaining five $\gamma_1'$ to $\gamma_5'$ on dark side of density distribution. At point A lying near the center of density distribution all of the curves are fixed. The curves are selectable independently of each other.

The selection of the gamma curve is made using two thumb wheel digital switches 143 and 144 of which the switch 143 is for selection among the gamma curves on bright side and the other 144 is for that on dark side. The output code of this gamma curve selection and the normalized output from the multiplier 120 are introduced into ROM 145 to address it. In this manner, an output as represented by one of the characteristic curves in FIG. 8 is obtained.

Figure 9:
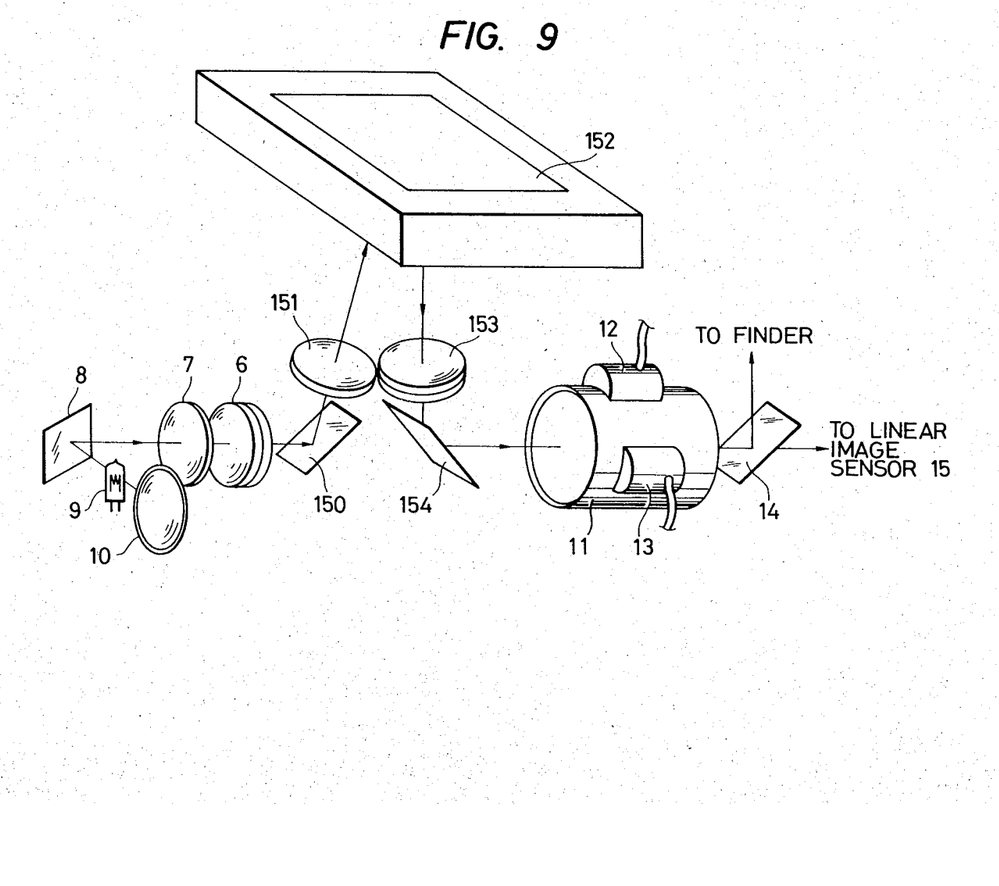
FIG. 9 schematically shows the arrangement of the essential parts of the optical system and mechanical system of another embodiment of the invention.

FIG. 9 shows an embodiment of the apparatus adapted for reflective document or original.

In this embodiment adapted for reflective document, the film holder previously shown in FIG. 1 is replaced by the members 150 to 154 shown in FIG. 9. 150 and 154 are mirrors, 151 is a dispersing lens, 152 is an original table on which a reflective document such as a photographic printing paper is placed, and 153 is a focusing lens. In this embodiment, however, it is to be noted that since one direction of the image is inverted, an electric circuit for correcting is required. This may be attained in a simple manner by making the secondary scanning possible in two opposite directions.

Figure 10:
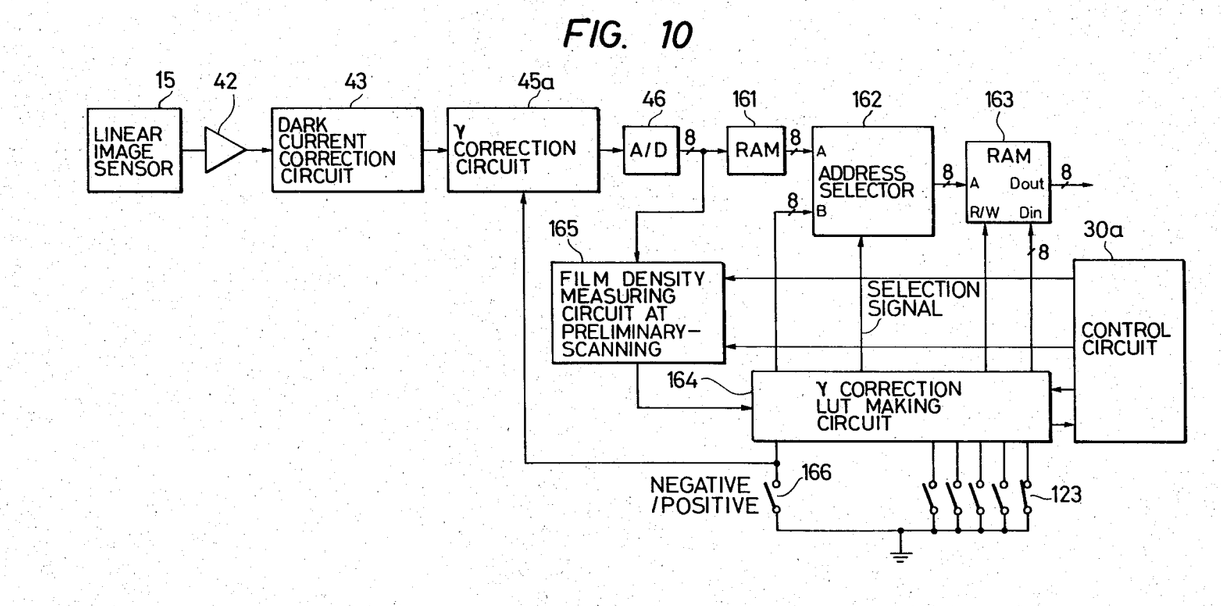
FIG. 10 is a block diagram showing another embodiment of γ-correcting circuit.

FIG. 10 shows another embodiment of the gamma correction circuit according to the invention.

In this embodiment A/D converted data are provisionally stored in a random access memory (referred to as RAM in brief) 161. Thereafter, the data are read out from the memory at a determined low speed. Another RAM 163 is used to carry put gamma correction. When RAM 163 is used as LUT for gamma correction, a selector 162 select input A in response to a selection signal from a gamma correction LUT making circuit 164. For making LUT, the selector selects input B in response to a selection signal.

165 is a circuit for measuring the density of film or photographic printing paper at the step of prescanning. This circuit 165 corresponds to the circuits 49, 50 and 51 previously shown. The circuit 165 is reset by a control circuit 30a simultaneously with the start of pre-scanning. At the completion of prescanning, a hold signal is externally applied to the circuit 165 to hold the result of the measurement.

The output of the circuit 165 is introduced into the gamma correction LUT making circuit 164 which makes an optimum gamma correction curve prior to the start of image input scanning, taking into account also the positions of external instruction switch 166 and negative/positive changeover switch 123 (this changeover switch 123 causes the gamma correction circuit 45a to perform changeover between negative and positive). When the optimum gamma correction curve is written in RAM 163, the apparatus is completely prepared for image input scanning.

For inputting of color image, at least three times of image input scanning is needed. Also, to make a printing plate, four times of scanning is needed for yellow, magenta, cyan and black. These scannings can be performed by using three or four filters 7 as shown in FIG. 1 and exchanging one for another before every pre-scanning. In this manner, color separation is realized by changing the spectral distribution of the illumination light.

Changes of illumination light and other factors for every filter can be corrected by pre-scanning in the same manner as described above. In this connection it is to be noted that a reference white should be put on a portion of the subject to be pre-scanned. In pre-scanning, the level of the reference white is detected and the correction of level for image input scanning is made so as to make the detected level constant for the respective colors.

In the case where the object is a photographic printing paper, therefore, a color reference chart containing white is affixed to a portion of the paper.

In the case of printing, the start position detecting photo interrupter 21 is useful because, as previously noted, it is able to detect position very precisely. It is possible to electronically generate marker signals for registration from the operation of the photo interrupter 21. Accurate registration can be attained making use of the marker signals by mixing picture signals with the marker signals being positioned at the same position in the secondary scanning direction and at the edge in the primary scanning direction.

It is of course possible to generate such marker signals at separate positions in the secondary scanning direction. In this manner, printing plates can be registered very easily.

While the invention has been particularly shown and described with reference to specific embodiments thereof, it is to be understood that the invention is not limited thereto but may be otherwise variously embodies within the scope of the invention. For instance, although the pre-scanning has been shown to be carried out at higher speed in the direction opposite to the direction for the image input scanning, the prescanning may be carried out in other ways. Similarly, the secondary scanning is not limited to that by moving the linear image sensor as shown in the above embodiments. The thing necessary is the relative movement between linear image sensor and image formed by the image-forming optical system. Many modifications and variations of the present invention are possible in the light of the above teachings.

We claim:

1. Apparatus for generating picture signals having an optical system for forming an image of an object on a predetermined plane and means for scanning said object image by a light-receiving surface disposed on said predetermined plane and generating an output indicative of the light intensity distribution of said object image on said plane, the apparatus comprising:
    (a) driving means for driving said scanning means relative to said object image to perform a first scan and a second scan, said driving means performing said second scan after the completion of said first scan;
    (b) control means for controlling the exposure of the light-receiving surface of said scanning means during said second scan in accordance with the output of said scanning means generated during said first scan; and
    (c) processing means for processing the output of said scanning means generated during said second scan into a picture signal corresponding to said object image in accordance with the output of said scanning means generated during said first scan.

2. Apparatus according to claim 1, wherein said driving means performs said second scan in response to the completion of said first scan.

3. Apparatus according to claim 1, wherein said image-forming optical system has a diaphragm and said exposure control means controls said diaphragm.

4. Apparatus according to claim 3, wherein said exposure control means includes means for detecting the maximum light intensity represented by the output of said scanning means and controls said diaphragm in accordance with the detected maximum light intensity.

5. Apparatus according to claim 1, wherein said processing means includes means for normalizing the output of said scanning means.

6. Apparatus according to claim 5, wherein said normalizing means includes means for detecting the minimum light intensity represented by the output of said scanning means and normalizes the output of said scanning means in accordance with the detected minimum light intensity.

7. Apparatus for generating picture signals of an image of a developed photographic film comprising:

(a) means for forming the image of said developed photographic film on a predetermined plane;
(b) a linear image sensor provided with a light-receiving surface disposed on said predetermined plane for generating an output indicative of the light intensity distribution of said image;
(c) driving means for moving said linear image sensor relative to the image of said developed photographic film to perform a first scan and a second scan, said driving means performing said second scan after the completion of said first scan;
(d) adjusting means for adjusting the output of said linear image sensor generated during said second scan in accordance with the output of said linear image sensor generated during said first scan; and
(e) processing means for processing the output of said linear image sensor generated during said second scan in accordance with the output of said linear image sensor generated during said first scan.

8. Appartus according to claim 7, wherein said driving means performs said second scan in response to the completion of said first scan.

9. Apparatus according to claim 7, wherein said means for forming an image has a diaphragm and said adjusting means controls said diaphragm.

* * * * *